United States Patent
Hu et al.

(10) Patent No.: US 8,279,719 B1
(45) Date of Patent: Oct. 2, 2012

(54) METHOD AND SYSTEM FOR COUPLING A LASER WITH A SLIDER IN AN ENERGY ASSISTED MAGNETIC RECORDING DISK DRIVE

(75) Inventors: Yufeng Hu, Fremont, CA (US); Yugang Wang, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 102 days.

(21) Appl. No.: 12/572,060

(22) Filed: Oct. 1, 2009

(51) Int. Cl.
*G11B 11/00* (2006.01)

(52) U.S. Cl. ................................... 369/13.01

(58) Field of Classification Search .................. None
See application file for complete search history.

(56) References Cited

U.S. PATENT DOCUMENTS

| | | | |
|---|---|---|---|
| 5,199,090 A | 3/1993 | Bell | |
| 6,075,673 A | 6/2000 | Wilde et al. | |
| 6,181,673 B1 | 1/2001 | Wilde et al. | |
| 6,404,706 B1 | 6/2002 | Stovall et al. | |
| 7,151,738 B2 | 12/2006 | Peng | |
| 7,272,102 B2 | 9/2007 | Challener | |
| 8,024,748 B1 | 9/2011 | Moravec et al. | |
| 8,134,794 B1 | 3/2012 | Wang | |
| 2003/0007279 A1 | 1/2003 | Johnson et al. | |
| 2003/0123335 A1* | 7/2003 | Rettner et al. | 369/13.24 |
| 2004/0062503 A1* | 4/2004 | Challener | 385/129 |
| 2004/0202054 A1 | 10/2004 | Hesselink et al. | |
| 2005/0052771 A1 | 3/2005 | Rausch et al. | |
| 2005/0190494 A1* | 9/2005 | Lee et al. | 360/126 |
| 2005/0190496 A1* | 9/2005 | Hamann et al. | 360/128 |
| 2005/0190682 A1 | 9/2005 | Gage et al. | |
| 2005/0254355 A1* | 11/2005 | Rettner et al. | 369/13.24 |
| 2006/0233061 A1 | 10/2006 | Rausch et al. | |
| 2006/0233062 A1 | 10/2006 | Bedillion et al. | |
| 2006/0256694 A1 | 11/2006 | Chu et al. | |
| 2007/0036040 A1 | 2/2007 | Mihalcea et al. | |
| 2007/0153417 A1* | 7/2007 | Suh et al. | 360/125 |
| 2007/0159720 A1 | 7/2007 | Sohn et al. | |
| 2007/0230047 A1* | 10/2007 | Jin et al. | 360/126 |
| 2007/0297082 A1* | 12/2007 | Peng et al. | 360/59 |
| 2008/0002298 A1 | 1/2008 | Sluzewski | |
| 2008/0013912 A1 | 1/2008 | Shukh et al. | |
| 2008/0055343 A1 | 3/2008 | Cho et al. | |
| 2008/0123219 A1 | 5/2008 | Gomez et al. | |
| 2009/0290454 A1* | 11/2009 | Fontana et al. | 369/13.13 |
| 2010/0002549 A1 | 1/2010 | Oumi et al. | |
| 2010/0123965 A1* | 5/2010 | Lee et al. | 360/59 |
| 2010/0165822 A1* | 7/2010 | Balamane et al. | 369/112.27 |
| 2010/0214685 A1* | 8/2010 | Seigler et al. | 360/59 |
| 2011/0007612 A1 | 1/2011 | Tanabe et al. | |

* cited by examiner

*Primary Examiner* — Joseph Feild
*Assistant Examiner* — Henok Heyi

(57) ABSTRACT

A method and system for providing an energy assisted magnetic recording (EAMR) transducer coupled with a laser are described. The EAMR transducer has an air-bearing surface (ABS) configured to reside in proximity to a media during use. The method and system include providing at least one waveguide, at least one write pole, and at least one coil. The waveguide(s) are for directing the energy from the laser toward the ABS. The write pole(s) each include a write pole tip, a yoke, a back pedestal and a return pole. The write pole tip is coupled to the back pedestal through the yoke. The back pedestal has at least one aperture therein. The aperture(s) are configured to allow the energy from the laser to pass therethrough. The coil(s) are for energizing the at least one write pole.

19 Claims, 5 Drawing Sheets

METHOD AND SYSTEM FOR COUPLING A LASER WITH A SLIDER IN AN ENERGY ASSISTED MAGNETIC RECORDING DISK DRIVE

BACKGROUND

FIG. 1 depicts a portion of a conventional energy assisted magnetic recording (EAMR) transducer 10. The conventional EAMR transducer 10 is used in writing a recording media (not shown in FIG. 1) and receives light, or energy, from a conventional laser (not shown in FIG. 1). The conventional EAMR transducer 10 includes gratings 32A and 32B, a conventional waveguide 12, and conventional pole 30. The conventional EAMR transducer 10 is shown with a laser spot 14 that is guided by the conventional waveguide 12 to a smaller spot 16 near the air-bearing surface (ABS) and thus the media (not shown). Other components that may be part of the conventional EAMR transducer 10 are not shown.

In operation, light from the spot 14 is coupled to the conventional EAMR transducer 10 using the gratings 32A and 32B. The waveguide 12, which is shown as a planar solid immersion mirror, directs light from the gratings 32A and 32B to the spot 16. In other conventional EAMR transducers, the conventional wave guides could take other forms, such as tapered waveguide that directs light toward the spot 16. The direction of travel of the light as directed by the conventional waveguide 12 can be seen by the arrows 18 and 20. A small region of the conventional media is heated by the spot 16. The conventional EAMR transducer 10 magnetically writes data to the heated region of the recording media by energizing the conventional pole 30.

Although the conventional EAMR transducer 10 may function, there are drawbacks. As can be seen by arrows 22, 24, and 26, a portion of the light from the spot 14 is blocked by the conventional pole 30. As a result, less energy is delivered to the spot 16. Consequently, heating of the media may be inefficient. The conventional EAMR transducer 10 may thus be less able to write to the media. Further, the light shown by arrows 22, 24, and 26 delivers energy to the pole 30. Consequently, the conventional pole 30 may be heated. Performance of the conventional pole 30 may thus be adversely affected. Although other conventional waveguide (not shown) might be used, analogous losses of energy may still exist. Consequently, performance of the conventional EAMR transducer 10 may suffer.

Accordingly, what is needed is a system and method for improving performance of an EAMR transducer.

BRIEF SUMMARY OF THE INVENTION

A method and system for providing an energy assisted magnetic recording (EAMR) transducer coupled with a laser are described. The EAMR transducer has an air-bearing surface (ABS) configured to reside in proximity to a media during use. The method and system include providing at least one waveguide, at least one write pole, and at least one coil. The waveguide(s) are for directing the energy from the laser toward the ABS. The write pole(s) each include a write pole tip, a yoke, a back pedestal and a return pole. The write pole tip is coupled to the back pedestal through the yoke. The back pedestal has at least one aperture therein. The aperture(s) are configured to allow the energy from the laser to pass therethrough. The coil(s) are for energizing the at least one write pole.

DETAILED DESCRIPTION OF THE PREFERRED EMBODIMENTS

Figure 1:
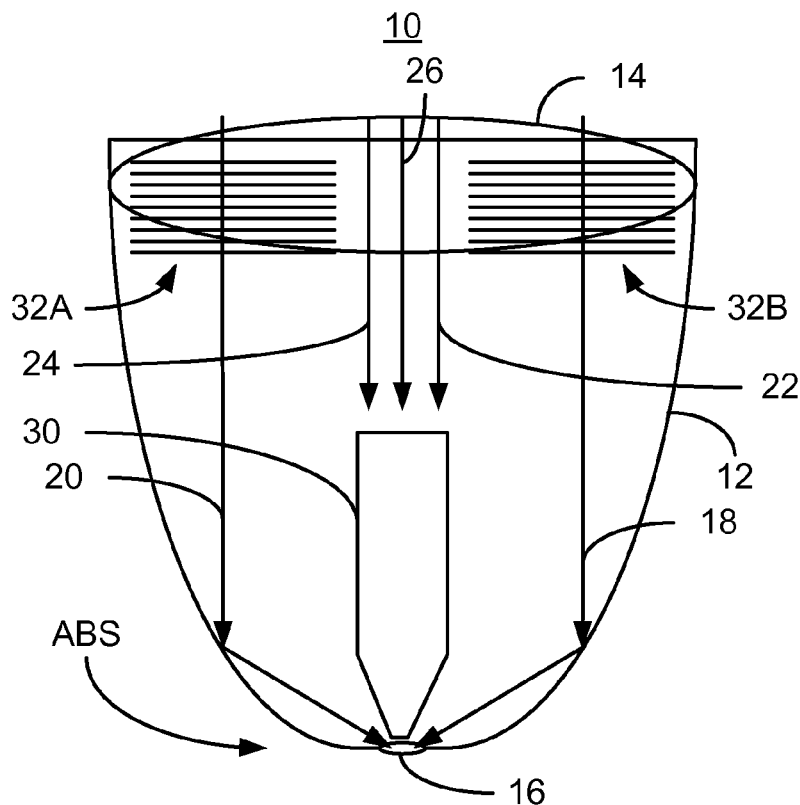
FIG. 1 depicts a side view of a conventional EAMR transducer.
Figure 2:
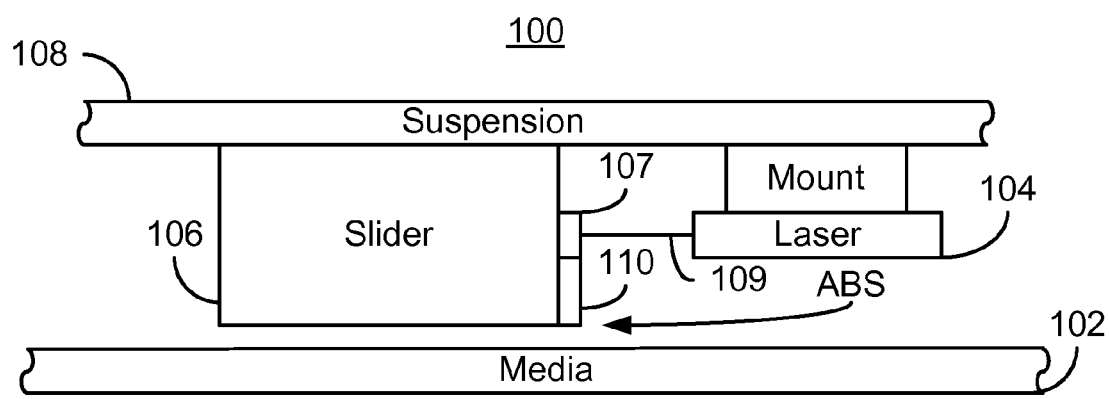
FIG. 2 depicts an exemplary embodiment of a portion of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes media 102, a laser 104, a slider 106, one or more gratings 107, suspension 108, and an EAMR transducer 110. In some embodiments, the laser 104 is a laser diode. The EAMR transducer 110 is coupled with the laser 104. In one embodiment, the EAMR transducer is optically coupled to the laser 104 through the grating 107. Thus, line 109 represents electromagnetic energy (light) provided from the laser 104 to the grating(s) 107. In addition, although the laser 104 is shown as separately mounted to the suspension 108, in other embodiments, the laser 104 may be mounted elsewhere, including but not limited to the slider 106.

The EAMR transducer 110 includes at least one waveguide (not explicitly shown in FIG. 2), at least one write pole (not explicitly shown in FIG. 2), and at least one coil (not explicitly shown in FIG. 2). The EAMR transducer 110 also has an air-bearing surface (ABS) configured to reside in proximity to a media 102 during use. The waveguide(s) are for directing the energy from the laser 104 toward the ABS. In the embodiment shown, the energy from the laser 104 is thus coupled into the transducer 110, and thus the waveguide(s), by the grating(s) 107. The write pole includes a back pedestal that includes one or more apertures therein. The energy from the laser 104 passes through the aperture(s). Thus, the energy may be used to heat a small portion of the media 102. The coil is used to energize the pole(s) during writing.

Figure 3:
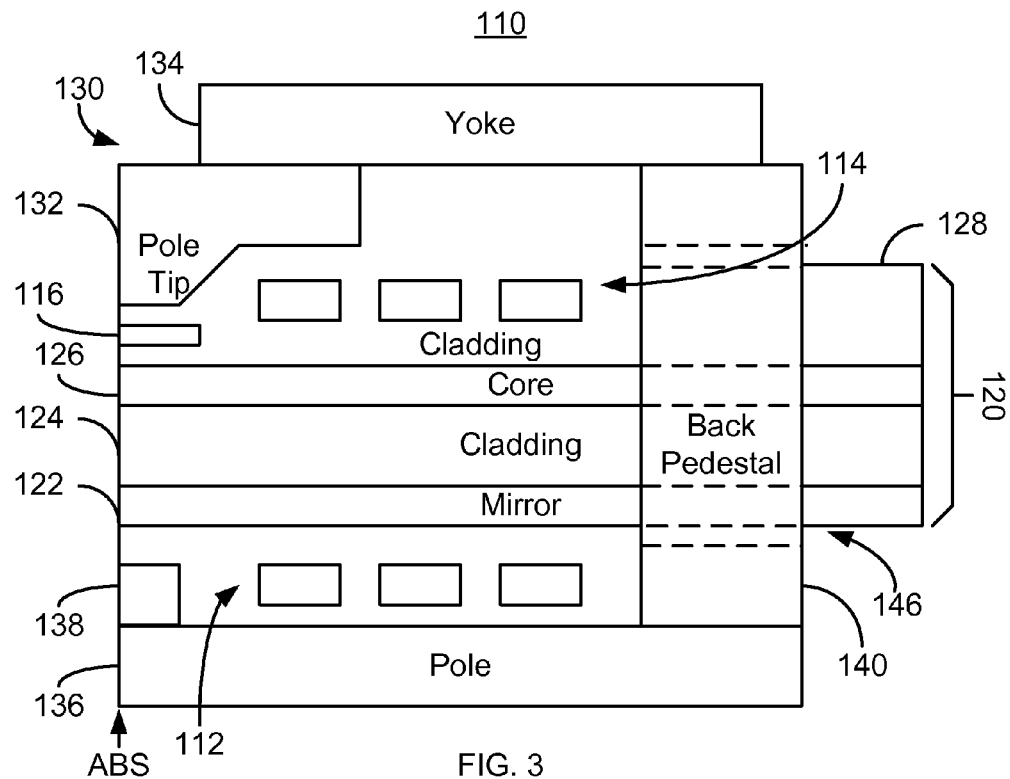
FIG. 3 depicts a side view of an exemplary embodiment of a portion of an EAMR transducer.
Figure 4:
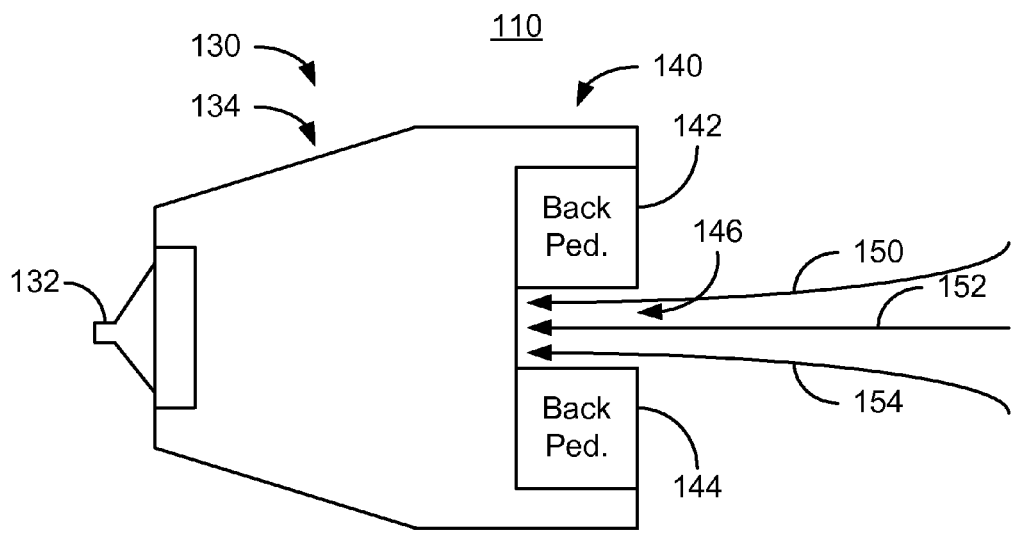
FIG. 4 depicts a top view of an exemplary embodiment of a portion of an EAMR transducer.

FIGS. 3-4 depict side and plan views of an exemplary embodiment of a portion of an EAMR transducer 110. For clarity, FIGS. 3-4 are not to scale. For simplicity not all portions of the EAMR transducer 110 are shown. In addition, although the transducer 100 is depicted in the context of particular components other and/or different components may be used. Thus, the EAMR transducer 110 shown in FIGS. 3-4 may be used in the EAMR disk drive 100. Referring to FIGS. 2-4, the EAMR transducer 110 has an ABS configured to reside in proximity to the media 102 during use of the transducer 110. The EAMR transducer 110 includes coils 112 and 114, a waveguide 120, and a pole 130. In the embodiment shown, the EAMR transducer 110 also includes a near-field transducer (NFT) 116. However, in alternate embodiments, the NFT 116 may be omitted. The coils 112 and 114 are for energizing the pole 130. Energy from the laser 104 is coupled to the waveguide 120 through the grating(s) 107. The waveguide 120 directs energy, shown in FIG. 4 by arrows 150, 152, and 154, from the laser 104/grating(s) 107 toward the ABS. In the embodiment shown, the waveguide 120 includes a mirror 122, cladding 124 and 128, as well as a core 126. However, in other embodiments, the waveguide 120 may include other and/or different components.

The pole 130 includes a pole tip 132, a yoke 134, a back pedestal 140, and return pole portions 136 and 138. The write pole tip 132 is coupled to the back pedestal 140 through the yoke 134. The back pedestal 140 includes an aperture 146 therein. In the embodiment shown in FIG. 4, the back pedestal 140 includes two pieces 142 and 144 with the aperture 146 between the pedestal pieces 142 and 144. The aperture 146 is configured to allow the energy to pass therethrough. In the embodiment shown, therefore, a portion of the waveguide 120 may reside within the aperture 146. Further, the portions of the back pedestal 140, such as pedestal pieces 142 and 144, forming the edges of the aperture 146 are separated from the waveguide 120. In some embodiments, the aperture 146 may be one micron larger in diameter than the portion of the waveguide 120 in the aperture 146. For example, if the waveguide is two microns in diameter, the aperture 146 may be three microns in diameter. Further, in the embodiment shown, the aperture 146 is centrally located in the back pedestal 140. In other embodiments, however, the aperture 146 may be offset from the center of the back pedestal 140.

In the embodiment shown in FIG. 4, the waveguide 120 may be a tapered waveguide. Thus, the energy from the laser tapers to a smaller spot when passing through the aperture 146. This is shown by arrows 150, 152, and 154. In the embodiment shown, substantially all of the energy provided to the media passes through the aperture 146 via the waveguide 120. However, in alternate embodiments, not all of the energy from the laser 104 passes through the aperture 146. For example, a portion of energy (not shown) may be directed around the pole 130, while another portion of the energy is directed through the aperture 146. In addition, in the embodiment shown, the pedestal pieces 142 and 144 are the same. The aperture 146 thus resides in the center of the pole 130. However, in other embodiments, the back pedestal pieces 142 and 144 may be different. In addition, in the embodiment shown in FIG. 4, the aperture 146 has a different width than the pedestal pieces 142 and 144. However, in other embodiments, the width of the aperture 146 may be the same as the back pedestal pieces 142 and 144.

In operation, light from the laser 104 is provided to the grating 107, then the waveguide 120. The waveguide 120 directs the energy through the aperture 146 and toward the ABS. In the embodiment shown, the NFT 116 may be used to further focus the energy onto a small spot on the media 102. Thus, a small region of the media 102 is heated. The coils 112 and 114 energize the pole tip 132 while the media is heated. Thus, the pole 130 may write data to the media 102.

The EAMR transducer 110 in the EAMR disk drive 100 may have improved efficiency. The energy shown by arrows 150, 152, and 154 is not blocked by the pole 130. In addition, the energy need not be otherwise directed around the back pedestal 140, then toward the pole tip 132, which may also result in losses. Instead, the energy reaches the ABS through the aperture 146. Consequently, optical efficiency of the EAMR transducer 110 may be improved. In addition, sufficient magnetic material may be provided in the pole 130, including the pole tip 132 and back pedestal 140, that the desired benefits may be achieved without unduly affecting magnetic performance of the pole 130. Further, heating of the pole 130 may be reduced or avoided. As a result, performance of the EAMR transducer 110 may be enhanced.

Figure 5:
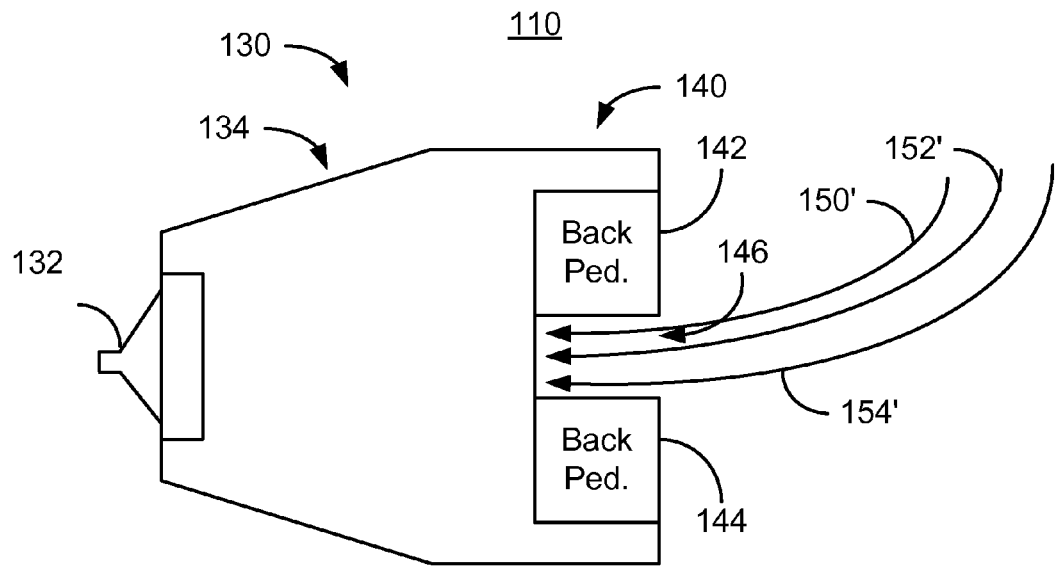
FIG. 5 depicts a top side view of another exemplary embodiment of a portion of an EAMR transducer.

FIG. 5 depicts a top view of another exemplary embodiment of a portion of an EAMR transducer 110. For clarity, FIG. 5 is not to scale. The EAMR transducer 110 may be used in the EAMR disk drive 100. Consequently, reference is made to FIGS. 2 and 5. In addition, the side view of the EAMR transducer 110 may be analogous to that shown in FIG. 3. The pole 130 shown is the same as the pole 130 depicted in FIG. 4. However, the waveguide used is a bended waveguide. Thus, the arrows 150', 152', and 154' depicting the direction of travel of energy from the laser 102 are bent with a large radius. In some such embodiments, the waveguide 120 is a tapered, bended waveguide. Thus, the energy from the laser 104 may also taper to a smaller spot in addition to passing through the aperture 146. In alternate embodiments, not all of the energy from the laser 104 passes through the aperture 146. For example, a portion of energy (not shown) may be directed around the pole 130, while another portion of the energy is directed through the aperture 146. In addition, in the embodiment shown, the pedestal pieces 142 and 144 are the same. The aperture 146 thus resides in the center of the pole 130. However, in other embodiments, the back pedestal pieces 142 and 144 may be different. In addition, in the embodiment shown in FIG. 5, the aperture 146 has a different width than the pedestal pieces 142 and 144. However, in other embodiments, the width of the aperture 146 may be the same as the back pedestal pieces 142 and 144. Finally, the aperture 146 is still configured such that it is larger than a portion of the waveguide (not shown in FIG. 5) passing through the aperture 146. In one embodiment, the aperture 146 has a width that is one micron larger than the portion of the waveguide that passes through the aperture 146. Further, in the embodiment shown, the aperture 146 is centrally located in the back pedestal 140. In other embodiments, however, the aperture 146 may be offset from the center of the back pedestal 140.

Although energy from the laser is bent along the path shown by arrows 150', 152', and 154', the EAMR transducer 110 depicted in FIG. 5 operates in an analogous manner to the EAMR transducer 110 depicted in FIG. 4. In addition, the EAMR transducer 110 in the EAMR disk drive 100 may share the benefits discussed above. For example, the EAMR transducer may have improved optical efficiency and reduced heating of the pole 130. As a result, performance of the EAMR transducer 110 may be enhanced.

Figure 6:
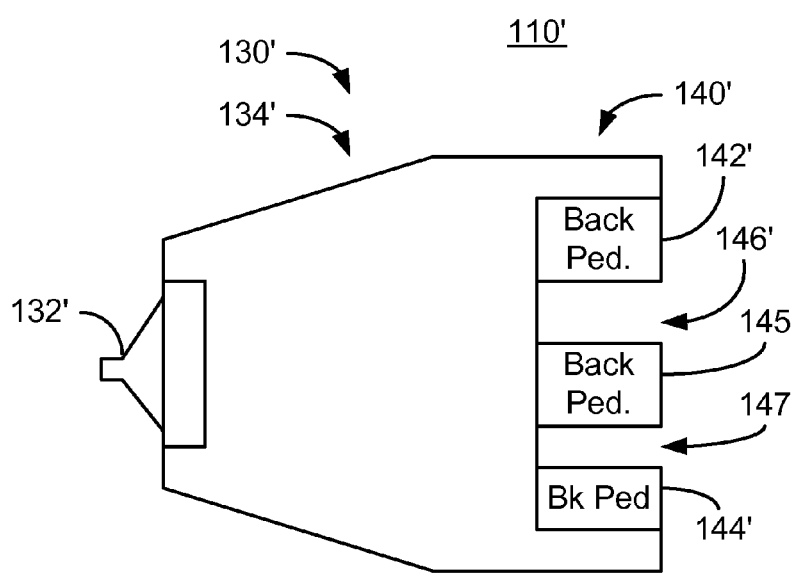
FIG. 6 depicts a top view of another exemplary embodiment of a portion of an EAMR transducer

FIG. 6 depicts a top view of another exemplary embodiment of a portion of an EAMR transducer 110'. For clarity, FIG. 6 is not to scale. The EAMR transducer 110' may be used in the EAMR disk drive 100. Consequently, reference is made to FIGS. 2 and 6. In addition, the side view of the EAMR transducer 110' may be analogous to the EAMR transducer 110 shown in FIG. 3. The EAMR transducer 110' may also be used with a tapered waveguide, a bended waveguide, a tapered, bended waveguide and/or another type of waveguide. For clarity, the path of light through the pole 130' is not shown. However, at least a portion of the energy from the laser 104 passes through the apertures 146' and 147 in the back pedestal 140". In some embodiments, substantially all of the energy used in heating the media 102 is provided through the apertures 146' and 147.

The pole 130' includes pole tip 132', yoke 134' and back pedestal 140'. Back pedestal 140' includes pieces 142', 144' and 145. Thus, apertures 146' and 147 are formed in the back pedestal 140'. In the embodiment shown, the back pedestal pieces 142', 144' and 145 are different. However, in another embodiment, two or more of the back pedestal pieces 142', 144' and 145 may be the same. In addition, in the embodiment shown, the apertures 146' and 147 differ in width. In other embodiments, the widths of the apertures 146' and 147 may be the same. Finally, the apertures 146' and 147 may still be configured such that they are larger than a portion of the waveguide (not shown in FIG. 6) passing through the aperture 146' and 147. In one embodiment, each aperture 146' and 147 has a width that is one micron larger than the portion of the waveguide that passes through the aperture 146' and 147, respectively. Further, in the embodiment shown, the apertures 146' and 147 are somewhat symmetrically located in the back pedestal 140. In other embodiments, however, the apertures 146' and 147 may not be symmetrically located around the center of the back pedestal 140.

The EAMR transducer 110' depicted in FIG. 6 operates in an analogous manner to the EAMR transducer 110 depicted in FIGS. 4-5. However, in the embodiment shown in FIG. 6, the light is split through multiple apertures 146' and 147. The EAMR transducer 110' in the EAMR disk drive 100 may share the benefits discussed above. For example, the EAMR transducer 110' may have improved optical efficiency and reduced heating of the pole 130' without sacrificing magnetic performance. As a result, performance of the EAMR transducer 110' may be enhanced.

Figure 7:
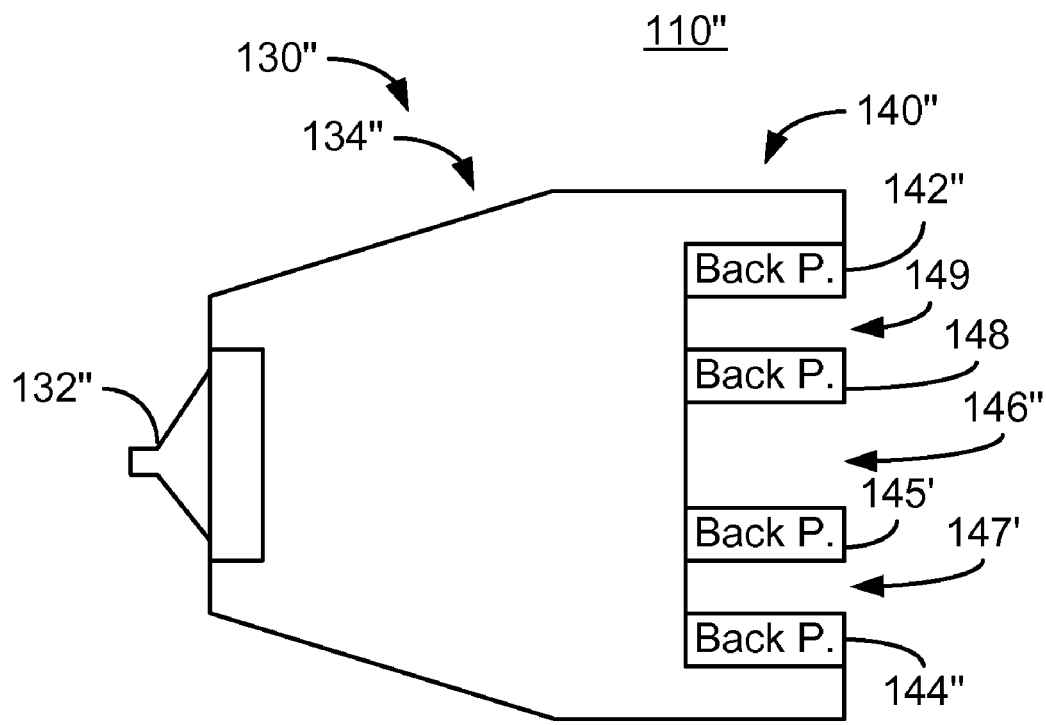
FIG. 7 depicts a top view of another exemplary embodiment of a portion of an EAMR transducer

FIG. 7 depicts a top view of another exemplary embodiment of a portion of an EAMR transducer 110". For clarity, FIG. 7 is not to scale. The EAMR transducer 110" may be used in the EAMR disk drive 100. Consequently, reference is made to FIGS. 2 and 7. In addition, the side view of the EAMR transducer 110" may be analogous to the EAMR transducer 110 depicted in FIG. 3. The EAMR transducer 110" may also be used with a tapered waveguide, a bended waveguide, a tapered, bended waveguide and/or another type of waveguide. For clarity, the path of light through the pole 130" is not shown. However, at least a portion of the energy from the laser 104 passes through the apertures 146", 147', and 149 in the back pedestal 140".

The pole 130" includes pole tip 132", yoke 134" and back pedestal 140". Back pedestal 140" includes pieces 142", 144", 145' and 148. Thus, apertures 146", 147', and 149 are formed in the back pedestal 140". In the embodiment shown, the pedestal pieces 142", 144", 145' and 148 are the same. However, in another embodiment, two or more of the back pedestal pieces 142", 144", 145', and 148 may be the same. In addition, in the embodiment shown, the apertures 146", 147', and 149 differ in width. In other embodiments, the widths of the apertures 146", 147', and 149 may be the same. Finally, the apertures 146", 147', and 149 may still be configured such that they are larger than a portion of the waveguide (not shown in FIG. 7) passing through the aperture 146", 147', and 149, respectively. In one embodiment, each aperture 146", 147', and 149 has a width that is one micron larger than the portion of the waveguide that passes through the aperture 146", 147', and 149, respectively. Further, in the embodiment shown, the aperture 146" is centrally located in the back pedestal 140". In other embodiments, however, the aperture 146" may be offset from the center of the back pedestal 140". In addition, the apertures 146", 147', and 149 are symmetrically, or evenly, distributed across the back pedestal 140". However, in other embodiments, the apertures 146", 147', and 149 need not be symmetrically located.

The EAMR transducer 110" depicted in FIG. 7 operates in an analogous manner to the EAMR transducer 110 depicted in FIGS. 4-5. However, in the embodiment shown in FIG. 7, the light is split through multiple apertures 146", 147', and 149. In addition, the EAMR transducer 110" in the EAMR disk drive 100 may share the benefits discussed above. For example, the EAMR transducer 110" may have improved optical efficiency and reduced heating of the pole 130" without sacrificing magnetic performance. As a result, performance of the EAMR transducer 110" may be enhanced.

Figure 8:
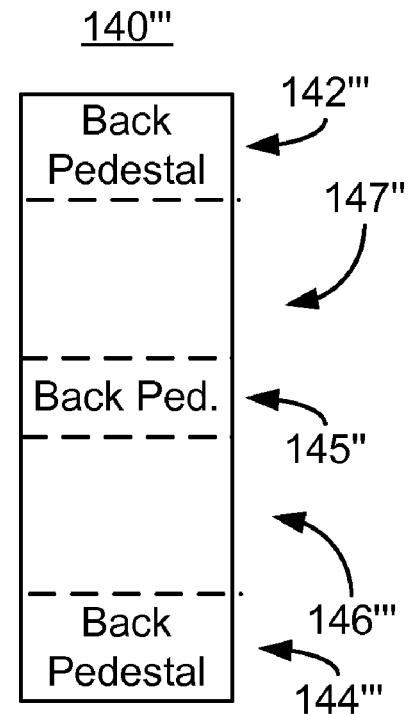
FIG. 8 depicts a side view of another exemplary embodiment of a back pedestal of an EAMR transducer

FIG. 8 depicts a side view of another exemplary embodiment of a back pedestal 140''' of an EAMR transducer, such as the transducer 110. For clarity, FIG. 8 is not to scale. The back pedestal 140''' may be part of a pole analogous to the pole(s) 130, 130', 130", and/or 130''' and be used in the EAMR disk drive 100. In addition, the top view of the pole including the back pedestal 140''' may be analogous to the pole(s) 130, 130', and 130". The EAMR transducer in which the back pedestal 140''' is used may also includes a tapered waveguide, a bended waveguide, a tapered, bended waveguide and/or another type of waveguide. For clarity, the path of light through the back pedestal 140''' is not shown. However, at least a portion of the energy from the laser 104 passes through the apertures 146''' and 147" in the back pedestal 140'''.

The back pedestal 140" includes pieces 142''', 144''', and 145". Thus, apertures 146''' and 147" are formed in the back pedestal 140'''. In the embodiment shown, the pedestal pieces 142''', 144''', and 145" are different. However, in another embodiment, two or more of the back pedestal pieces 142''', 144''' and 145" may be the same. In addition, in the embodiment shown, the apertures 146''' and 147" have the same height. In other embodiments, the heights of the apertures 146''' and 147" may be the same. Finally, the apertures 146''' and 147" may still be configured such that they are larger than a portion of the waveguide (not shown in FIG. 8) passing through the apertures 146''' and 147". In one embodiment, each aperture 146", 147', and 149 has a width and a height that is one micron larger than the portion of the waveguide that passes through the aperture 146''' and 147", respectively. In the embodiment shown, the apertures are aligned vertically, along the height of the back pedestal 140'''. However, in another embodiment, the apertures 142''' and 147" may be otherwise distributed through the back pedestal 140'''.

The EAMR transducer using the pole 140''' depicted in FIG. 8 operates in an analogous manner to the EAMR transducer 110, 110', 110" depicted in FIGS. 2-7. It is also noted that some combination of the back pedestals 140, 140', 140", and 140''' may be used. In the embodiment shown in FIG. 8, the light is split through multiple apertures 146''' and 147". In addition, the EAMR transducer including the back pedestal 140''' may share the benefits discussed above. For example, the EAMR transducer may have improved optical efficiency and reduced heating of the pole 130'''. As a result, performance of the EAMR transducer 110''' may be enhanced.

Figure 9:
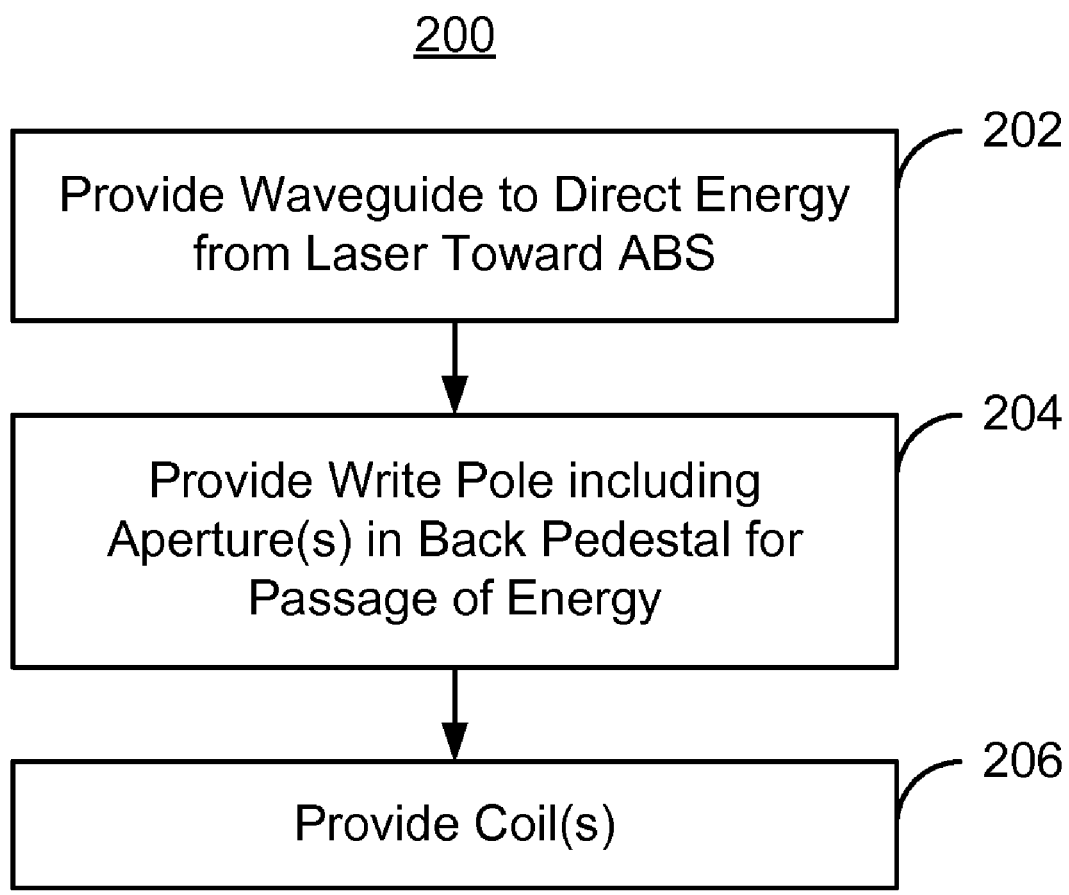
FIG. 9 depicts an exemplary embodiment of a method of forming a portion of an EAMR transducer.

FIG. 9 depicts an exemplary embodiment of a method 200 of forming a portion of an EAMR transducer. For simplicity, some steps may be omitted or combined. The method 200 is described in the context of the EAMR transducer 110. However, the method 200 may be used to fabricate other EAMR transducers. In addition, the method 200 is described in the context of fabricating a single transducer 100. However, multiple transducers may be fabricated substantially in parallel. The method 200 also starts after formation of a portion of the EAMR transducer 110. Other structures may also be fabricated as part of formation of the transducer 110. Further, although described as separate steps, portions of the method 200 may be interleaved as the transducer 110 may be manufactured layer by layer. At least one waveguide 120 for directing the energy from the laser 104 toward the ABS is provided, via step 202. Step 202 may thus include fabricating the mirror 122, cladding 124 and 128, and the core 126. In some embodiments, fabrication of the NFT 116 may also be included in step 202. In other embodiments, in which the waveguide 120 includes other constituents, step 202 may include fabricating other structures.

At least one write pole 130 is provided, via step 204. Step 204 may thus include formation of a write pole tip 132, a yoke 134, a back pedestal 140 and a return pole 136. Step 204 also includes forming the back pedestal 140 such that aperture 146 is formed. In other embodiments, for example the transducer 110', multiple apertures may be formed. Thus, back pedestal pieces 142 and 144 may be fabricated. Further, the aperture 146 is configured to allow energy from the laser to pass therethrough. In some embodiments, therefore, the aperture 146 is configured to contain a portion of the waveguide 120. Thus, the width and/or height of the apertures 146 may also be set in step 204 such that the magnetic material forming the back pedestal 140 is separated from the waveguide 120. In some embodiments, the aperture 146 is formed in step 204 such that the edges of the aperture 146 are separated from the waveguide 120 by at least one-half micron.

One or more of the coils 112 and 114 are also provided, via step 206. Fabrication of the transducer 110 may then be completed. Further, the laser 104 and other portions of the disk drive 100 may be assembled once the transducer 110 has been completed. Thus, using the method 200, the transducer 110, 110', and 110" and back pedestal 140''' may be fabricated. Consequently, the benefits of the transducer 110, 110', and 110" and back pedestals 140, 140', 140", and 140''' may be achieved.

We claim:

1. An energy assisted magnetic recording (EAMR) transducer coupled with a laser for providing energy and having an air-bearing surface (ABS) configured to reside in proximity to a media during use, the EAMR transducer comprising:
at least one waveguide for directing the energy from the laser toward the ABS;
at least one write pole including a write pole tip, a yoke, a back pedestal and a return pole, the write pole tip being coupled to the back pedestal through the yoke, the back pedestal being distal from the ABS, the write pole tip being proximate to the ABS, the back pedestal having at least one aperture therein, the at least one aperture configured to allow the energy directed by the waveguide to pass therethrough, a portion of the at least one waveguide residing in the at least one aperture and having first width, the at least one aperture having a second width greater than the first width; and
at least one coil for energizing the at least one write pole.

2. The EAMR transducer of claim 1 wherein the has a second width is at least one micron greater than the first width.

3. The EAMR transducer of claim 1 wherein the back pedestal further includes:
a plurality of back pedestal pieces, the at least one aperture residing between the plurality of back pedestal pieces.

4. The EAMR transducer of claim 3 wherein the plurality of back pedestal pieces are substantially the same.

5. The EAMR transducer of claim 3 wherein the plurality of back pedestal pieces further includes three back pedestal pieces and wherein the at least one aperture includes two apertures.

6. The EAMR transducer of claim 3 wherein each of the at least one aperture has an aperture width and each of the plurality of back pedestal pieces has a pedestal width, the pedestal width being substantially equal to the aperture width.

7. The EAMR transducer of claim 3 wherein each of the at least one aperture has an aperture width and each of the plurality of back pedestal pieces has a pedestal width, the pedestal width being different from the aperture width.

8. The EAMR transducer of claim 1 wherein the at least one write pole has a central axis and wherein at least one aperture are evenly distributed around the central axis.

9. An energy assisted magnetic recording (EAMR) transducer coupled with a laser for providing energy and having an air-bearing surface (ABS) configured to reside in proximity to a media during use, the EAMR transducer comprising:
a waveguide for directing the energy from the laser toward the ABS;
at least one write pole including a write pole tip, a yoke, a back pedestal, a return pole and a central axis, the write pole tip being coupled to the back pedestal through the yoke, the back pedestal being distal from the ABS, the write pole tip being proximate to the ABS, the back pedestal including a plurality of back pedestal pieces having an aperture therebetween, the central axis passing through the aperture, a portion of the waveguide residing within the aperture and being centered on the central axis, the portion of the waveguide having a first width, the aperture having a second width at least one micron greater than the first width; and
at least one coil for energizing the at least one write pole.

10. An energy assisted magnetic recording (EAMR) disk drive comprising:
a slider;
a laser for providing energy;
at least one EAMR head coupled with the slider and receiving the energy, the EAMR head including a EAMR transducer having an air-bearing surface (ABS) configured to reside in proximity to a media during use, the EAMR transducer including at least one waveguide, at least one write pole, and at least one coil, the at least one waveguide for directing the energy from the laser toward the ABS, the at least one write pole including a write pole tip, a yoke, a back pedestal and a return pole, the write pole tip being coupled to the back pedestal through the yoke, the back pedestal being distal from the ABS, the write pole tip being proximate to the ABS, the back pedestal having at least one aperture therein, the at least one aperture configured to allow the energy directed by the waveguide to pass therethrough, a portion of the at least one waveguide residing in the at least one aperture and having first width, the at least one aperture having a second width greater than the first width, the at least one coil for energizing the at least one write pole.

11. A method for providing an energy assisted magnetic recording (EAMR) transducer coupled with a laser for providing energy and having an air-bearing surface (ABS) configured to reside in proximity to a media during use, the method comprising:
providing at least one waveguide for directing the energy from the laser toward the ABS;
providing at least one write pole including a write pole tip, a yoke, a back pedestal and a return pole, the write pole tip being coupled to the back pedestal through the yoke, the back pedestal being distal from the ABS, the write pole tip being proximate to the ABS, the back pedestal having at least one aperture therein, the at least one aperture configured to allow the energy directed by the waveguide to pass therethrough, a portion of the at least one waveguide residing in the at least one aperture; and
providing at least one coil for energizing the at least one write pole.

12. The method of claim 11 wherein the second width is at least one micron greater than the first width.

13. The method of claim 11 wherein the step or providing the at least one write pole further includes:
   providing a plurality of back pedestal pieces for the back pedestal, the at least one aperture residing between the plurality of back pedestal pieces.

14. The method of claim 13 wherein the plurality of back pedestal pieces are substantially the same.

15. The method of claim 13 wherein the plurality of back pedestal pieces are different.

16. The method of claim 13 wherein the plurality of back pedestal pieces further includes three back pedestal pieces and wherein the at least one aperture includes two apertures.

17. The method of claim 13 wherein each of the at least one aperture has an aperture width and each of the plurality of back pedestal pieces has a pedestal width, the pedestal width being substantially equal to the aperture width.

18. The method of claim 13 wherein each of the at least one aperture has an aperture width and each of the plurality of back pedestal pieces has a pedestal width, the pedestal width being different from to the aperture width.

19. The method of claim 11 wherein the at least one write pole has a central axis and wherein at least one aperture is even distributed around the central axis.

\* \* \* \* \*